(12) United States Patent
Burger et al.

(10) Patent No.: US 9,369,591 B2
(45) Date of Patent: *Jun. 14, 2016

(54) SYSTEM AND METHOD FOR CORRELATING USER CALL RESPONSE TO ELECTRONIC MESSAGES

(71) Applicant: YODEL INNOVATIONS, LLC, Great Falls, VA (US)

(72) Inventors: Eric William Burger, Great Falls, VA (US); Jonathan Andrew Pelson, Great Falls, VA (US); David Heard, Potomac, MD (US); Gary Traver, Denver, CO (US)

(73) Assignee: YODEL INNOVATIONS, LLC, Great Falls, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,368

(22) Filed: Jul. 13, 2015

(65) Prior Publication Data

US 2015/0319317 A1    Nov. 5, 2015

Related U.S. Application Data

(63) Continuation of application No. 13/737,546, filed on Jan. 9, 2013, now Pat. No. 9,105,057.

(60) Provisional application No. 61/584,613, filed on Jan. 9, 2012.

(51) Int. Cl.
*H04M 15/00* (2006.01)
*G06Q 30/02* (2012.01)
(Continued)

(52) U.S. Cl.
CPC ....... *H04M 15/8088* (2013.01); *G06Q 30/0246* (2013.01); *G06Q 30/04* (2013.01); *H04M 3/42382* (2013.01); *H04M 3/4936* (2013.01);
(Continued)

(58) Field of Classification Search
CPC .......... H04M 15/8088; H04M 3/5235; H04M 15/08; H04M 3/42382; H04M 3/4936; H04M 2201/18; H04M 2203/652; H04M 3/51; H04M 3/493; G06Q 30/0246; G06Q 30/04; H04W 4/16
USPC ........................... 455/405–408, 412.1–414.4
See application file for complete search history.

(56) References Cited

U.S. PATENT DOCUMENTS 3,614,328 A    10/1971    McNaughton et al.
5,058,152 A    10/1991    Solomon et al.
(Continued)

OTHER PUBLICATIONS

Filigheddu, L. "Cli to Call Dissected: The Role of Social Media," www.techgenial.com/2010/02/click-to-call- dissected-the-role-of-social-media.html, Feb. 3, 2010.

*Primary Examiner* — Sharad Rampuria
(74) *Attorney, Agent, or Firm* — Muir Patent Law, PLLC

(57) ABSTRACT

A method of correlating voice calls with received electronic messages includes sending an electronic message associated with a second party to a first party; subsequently receiving a voice call from the first party by the second party; automatically determining whether the voice call resulted from the electronic message, based on electronically stored information about the sending of the electronic message and about the subsequently received voice call; and if it is determined that the voice call resulted from the electronic message, flagging the voice call to have a different status from voice calls not determined to have resulted from an electronic message.

20 Claims, 8 Drawing Sheets

210

| User ID | Transaction Type | Merchant | Time | Duration | Call Type | Device |
|---|---|---|---|---|---|---|
| 555-1234 | receive Ad | XYZ | 12:01 PM | 2:10 | — | Smartphone |
| 555-1234 | make call | XYZ | 12:03 PM | 10:35 | Select Link | Smartphone |
| 555-4321 | receive Ad | ABC | 12:12 PM | 0:15 | — | PC |
| . | . | . | . | . | . | . |
| . | . | . | . | . | . | . |
| . | . | . | . | . | . | . |

211  212  213  214  215  216  217

(51) Int. Cl.
- *H04W 4/16* (2009.01)
- *G06Q 30/04* (2012.01)
- *H04M 3/493* (2006.01)
- *H04M 3/523* (2006.01)
- *H04M 15/08* (2006.01)
- *H04M 3/42* (2006.01)
- *H04M 3/51* (2006.01)

(52) U.S. Cl.
CPC ............ *H04M 3/5235* (2013.01); *H04M 15/08* (2013.01); *H04W 4/16* (2013.01); *H04M 3/493* (2013.01); *H04M 3/51* (2013.01); *H04M 2201/18* (2013.01); *H04M 2203/652* (2013.01)

(56) References Cited

U.S. PATENT DOCUMENTS

| | | | |
|---|---|---|---|
| 5,557,659 A | 9/1996 | Hyde-Thomson | |
| 6,397,040 B1 | 5/2002 | Titmuss et al. | |
| 6,470,079 B1 | 10/2002 | Benson | |
| 6,823,047 B1 | 11/2004 | Cruickshank | |
| 7,120,235 B2 | 10/2006 | Altberg et al. | |
| 7,283,808 B2 | 10/2007 | Castell et al. | |
| 7,403,905 B2 | 7/2008 | Shioda et al. | |
| 7,555,106 B2 | 6/2009 | Kumar | |
| 7,873,708 B2 | 1/2011 | Durand et al. | |
| 7,953,219 B2 | 5/2011 | Freedman et al. | |
| 8,428,229 B2 | 4/2013 | Yasrebi et al. | |
| 8,688,092 B1* | 4/2014 | Bladon | G10L 15/26 379/71 |
| 2003/0187655 A1* | 10/2003 | Dunsmuir | H04M 3/53333 704/270 |
| 2003/0191676 A1 | 10/2003 | Templeton | |
| 2004/0166832 A1* | 8/2004 | Portman | G06Q 30/02 455/412.1 |
| 2006/0246958 A1* | 11/2006 | Benco | H04W 4/16 455/567 |
| 2007/0112656 A1 | 5/2007 | Howe et al. | |
| 2007/0189472 A1 | 8/2007 | Lamb et al. | |
| 2010/0114722 A1 | 5/2010 | Ueshima et al. | |
| 2010/0293063 A1 | 11/2010 | Atherton et al. | |

\* cited by examiner

FIG. 2A

| Merchant ID | Categories | Location | Valid Dates | Merchant Phone | Ad Broker | Advertising Copy ... | ... |
|---|---|---|---|---|---|---|---|
| 201 | 202 | 204 | 205 | 206 | 207 | 208 | 209 |

| User ID 211 | Transaction Type 212 | Merchant 213 | Time 214 | Duration 215 | Call Type 216 | Device 217 |
|---|---|---|---|---|---|---|
| 555-1234 | receive Ad | XYZ | 12:01 PM | 2:10 | — | Smartphone |
| 555-1234 | make call | XYZ | 12:03 PM | 10:35 | Select Link | Smartphone |
| 555-4321 | receive Ad | ABC | 12:12 PM | 0:15 | — | PC |
| . . . | | | | | | . . . |

| Caller ID 221 | Call Time 222 | Call Duration 223 | Call Type Status 224 | Billing Rate 225 | Total Bill Amount 226 |
|---|---|---|---|---|---|
| 555-1234 | 12:03 pm | 11 | Ad-sale | $1.00/min | $11.00 |
| 555-4321 | 4:35 pm | 32 | No Ad | $.20/min | $6.40 |
| 555-1238 | 4:45 pm | 3 | Ad | $0.50/min | $1.50 |
| . . . | . . . | . . . | . . . | . . . | . . . |

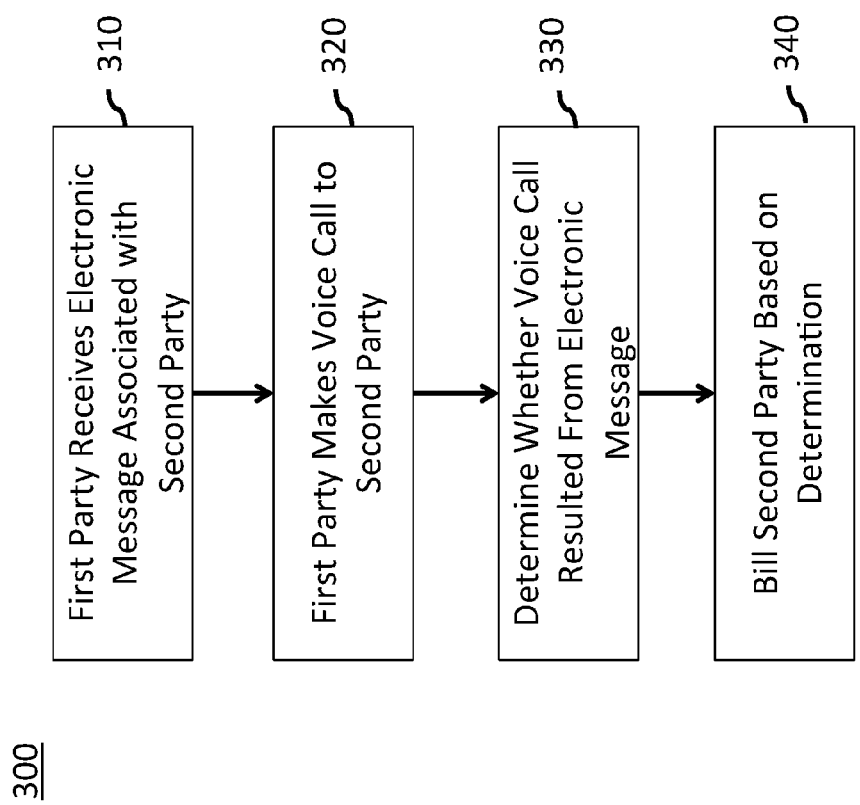

SYSTEM AND METHOD FOR CORRELATING USER CALL RESPONSE TO ELECTRONIC MESSAGES

CROSS-REFERENCE TO RELATED APPLICATION

This application is a Continuation of and claims priority to U.S. patent application Ser. No. 13/737,546 filed on Jan. 9, 2014 which claims the benefit of priority to U.S. Provisional Patent Application No. 61/584,613, filed Jan. 9, 2012, the contents of each of which are incorporated herein by reference in their entirety.

BACKGROUND

1. Field

This disclosure relates to a system and method for correlating user call response to electronic messages. More specifically, this disclosure relates to a system and method for correlating user voice call response to electronic messages received by users over a computer network.

2. Background

The World Wide Web has become a major platform not only for information exchange, entertainment, and communications, but for the promotion and distribution of products and services. Suppliers reach consumers directly by creating their own web sites. However, often suppliers actually get the consumer's attention from the sending of electronic messages. This may include, for example, the placement of advertisements (e.g., banner ads) on a page relevant to the consumer and connected to the advertiser's product; through consumer search, where the product shows up in the results; or through consumer search, where the product appears as an ad that while not directly relevant to what the consumer is searching for, the search engine determines the consumer would be interested in such a product or service. Once an advertisement catches the consumer's eye, the consumer may click through the advertisement to go to the advertiser's web site.

Technologies for collecting advertising content and optimizing search results to present appropriate advertisements to consumers are well known to those knowledgeable in the state-of-the-art of search technology.

Search-based advertising works well for personal computers and tablet computers with keyboards and relatively large displays. However, for many people, their only access to the Internet is via a mobile phone. The mobile environment is quite different than the personal computer environment. For example, mobile phones have a tiny, hard to use keyboard at best or a 12-key keypad at worst. The literature describes many methods of using mobile technology, such as location, to assist with mobile search.

At the same time the consumer has difficulties using the mobile Internet, many businesses, especially locally-scoped service businesses, have limited or no Internet presence. Without an Internet or more specifically World-Wide Web presence, even if consumers could overcome the limitations of the mobile device and click through on an advertisement, the merchant does not have a Web site or Internet presence for them to click through to.

Even if the merchant has an Internet presence, the nature of their goods or services may be more conducive to a voice conversation. The cost to the consumer for a voice call, if not in direct monetary cost, is substantial compared to Web click through. For example, a user may need to spend both additional time and money for a voice call instead of a Web click through.

While the majority of small businesses may not have an Internet presence, almost all have a telephone. Over forty years ago, the price of a telephone call was relatively expensive and collect calling required operator intervention. In order to overcome a prospective customer's hesitation to call the merchant, the merchant offered to pay for the call. Because a call from a prospect was worth more to the merchant than a regular call, the phone company was able to charge a premium to the merchant for the call. The phone company created a toll-free, 800 number, or, the name at the time, inward-WATS service. It was not uncommon for the cost of an 800 call to be five or more times the cost of a regular call.

Prior to the break-up of AT&T, the billing relationship between the merchant and phone company was simple. All calls originated on the AT&T network and all merchants were AT&T's customers. Thus, AT&T knew when the merchant's customer placed a premium call to the merchant. AT&T knew not to bill the customer, based on the customer dialing an 800 number. AT&T also knew to bill the merchant for the premium call. Lastly, as a subscriber to AT&T's toll free service, the merchant expected a bill from AT&T for the call, at the premium rate.

One of the benefits of using an 800 number is the merchant gets a bill with all of their inbound calls enumerated. Another benefit is the merchant can change the local number the 800 number translates to if they so wish. For example, the merchant could send the 800 number to an interactive voice response (IVR) system to screen the call.

U.S. Pat. No. 5,058,152 teaches how to use an arbitrary direct inward dial (DID) phone number for the purposes of providing confidentiality and anonymity of callers in a classified advertising system. This system uses the DID, which gets delivered to a system controller, to lookup the advertiser's phone number, and to then connect the caller to the advertiser. The commercial embodiment of this system, AdConnect (described in a Fort Lauderdale SunSentinel newspaper article on Aug. 20, 1993 titled New Service For Classified Ads Offered), also enabled the publisher, although not the advertiser, to gather statistics on how many times an advertisement generated calls, how long an ad ran before the item sold, and so on.

Businesses want to be able to advertise one number and use that number for all of their customers' and prospects' interactions with the business. Once a consumer learns the business' phone number, the business does not want them to have to learn a new number. We have considerable experience with this phenomena in the U.S. with respect to area code splits. Whenever there is the potential for businesses to have to change their number, even if only the area code, the comments against the split come quickly.

It was a goal of the '152 patent to hide the actual phone number of the called party. Thus, such DID-based methods for monitoring calls or providing differential billing are far from optimal, as they either require the business to always use the expensive DID or require the business to advertise a different number for direct, non-advertising related calls. Likewise, by definition, an 800 number is not the actual phone number of the called party and thus suffers the same problems.

According to the International Telecommunications Union Telecommunications Sector (ITU—T) in their ITU News article The world in 2010: ICT facts and figures which appear in December, 2010, there are more than 2 billion Internet users, of which almost 1.5 billion connect wirelessly, most using mobile phones. While these phones include Internet connections, it is important to note that these devices are phones first, and Internet devices second.

U.S. Pat. No. 7,873,708 teaches how to use a content server to enable mobile advertising search and to format Internet advertising content appropriate for mobile phone use. This patent also discloses using the system to attach coupons to the offers.

However, in all of these methods of advertising, there is not a direct correlation between the advertisement and purchase. This makes the advertisement of limited value to the merchant. The merchant pays cents or fractions of a cent per advertising impression, but only a small fraction of people viewing the advertisement actually buy the product or service.

U.S. Pat. No. 7,403,905 teaches one method for connecting a consumer's purchase to a mobile advertisement impression. However, the correlation of the purchase to the consumer and the merchant is made by special equipment at the merchant's premises. Moreover, the system does not work if the consumer is not physically at the merchant, such as for an Internet or phone order.

Sitofono in Italy provides a system and service that allows merchants to put click-to-call buttons on their web sites and mobile sites. This service enables merchants to convert more prospects into customers by making it easy for the prospect to simply and easily contact the merchant. This gives the merchant the opportunity to use the compelling mode of interactive sales techniques to close a sale. Moreover, some service providers charge a premium for these calls, as they are sales-related, highly qualified, and with the enhanced likelihood of a sale, merchants are more willing to pay. However, such a service requires the merchant to use a separate number for billing purposes. Such a separate number can be expensive and does not leverage the merchant's existing marketing of their usual phone number.

SUMMARY

A system and method for correlating user call response to electronic messages are disclosed. More specifically, a system and method for correlating user voice call response to electronic messages received by users over a computer network are disclosed. In one embodiment, for example, a method is disclosed including sending an electronic message associated with a second party to a first party; subsequently receiving a voice call from the first party by the second party; automatically determining whether the voice call resulted from the electronic message, based on electronically stored information about the sending of the electronic message and about the subsequently received voice call; and if it is determined that the voice call resulted from the electronic message, flagging the voice call to have a different status from voice calls not determined to have resulted from an electronic message.

BRIEF DESCRIPTION OF THE DRAWINGS

Example embodiments will be more clearly understood from the following detailed description taken in conjunction with the accompanying drawings. The figures represent non-limiting example embodiments as described herein.

FIG. 2A is a depiction of exemplary advertisement information, according to certain disclosed embodiments;

FIG. 2B is a depiction of exemplary transaction information, according to certain disclosed embodiments;

FIG. 2C is a depiction of exemplary call information, according to certain disclosed embodiments;

FIG. 3 is a flow chart of an exemplary method, according to certain disclosed embodiments;

DETAILED DESCRIPTION

Figure 1:
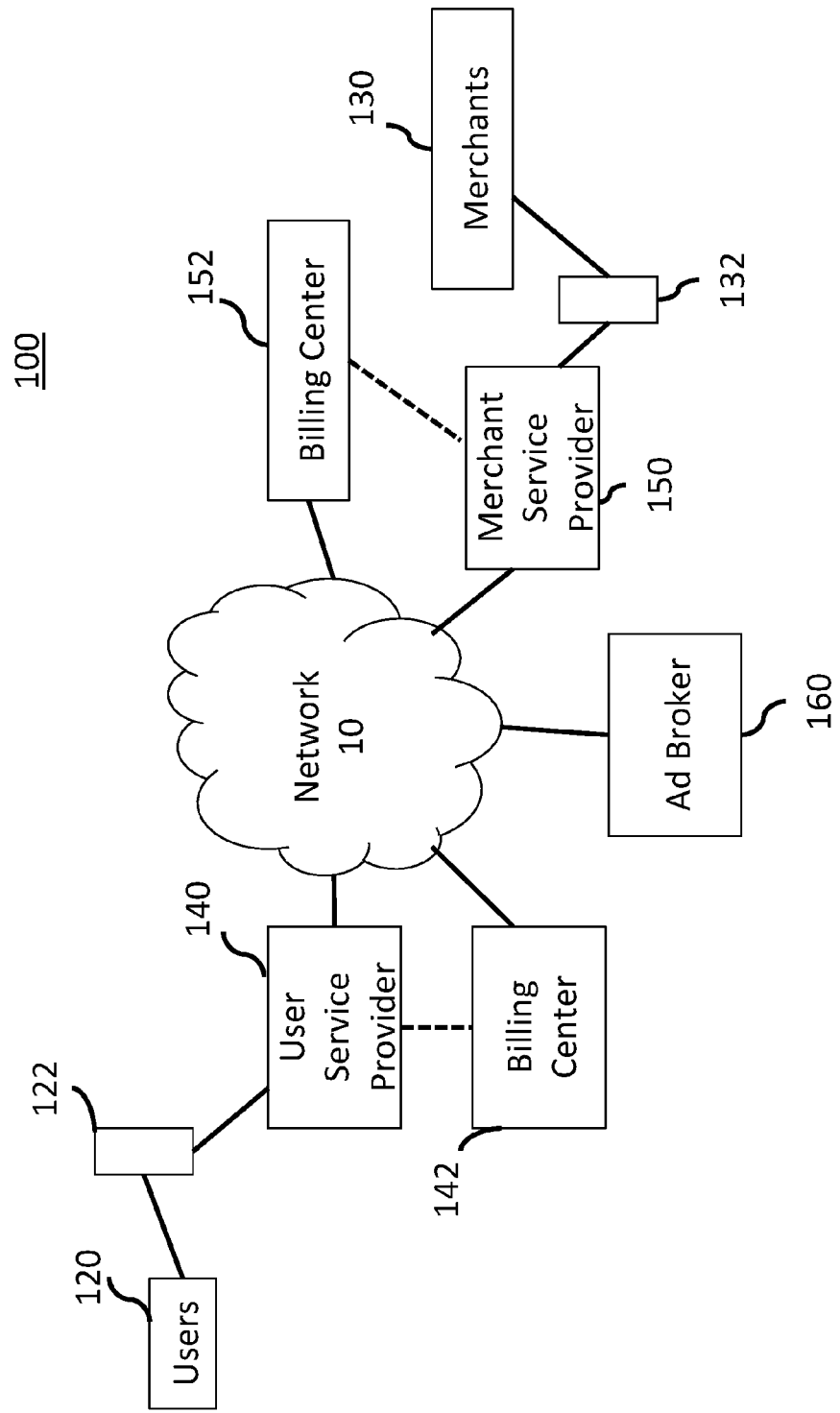
FIG. 1 is an illustration of an exemplary system for electronic messaging and voice calling, according to certain disclosed embodiments.

The present disclosure will be described more fully hereinafter with reference to the accompanying drawings, in which various embodiments are shown. The invention may, however, be embodied in many different forms and should not be construed as limited to the embodiments set forth herein. In the drawings, like numbers refer to like elements throughout.

It will be understood that when an element is referred to as being "connected" or "coupled" to or "in communication with" another element, it can be directly connected or coupled to or in communication with the other element or intervening elements may be present. In contrast, when an element is referred to as being "directly connected" or "directly coupled" or "in direct communication with" another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

This disclosure includes particular terminology and descriptions that relate to electronic messages, voice calls, advertisements, merchants, and billing. The descriptions are intended to provide a framework for certain terms and concepts, and are not intended to limit the scope of this disclosure unless explicitly stated.

FIG. 1 depicts an exemplary system 100 for implementing certain methods described herein, according to certain embodiments. As shown in FIG. 1, a system 100 includes a network 110, users 120, devices 122, merchants 130, devices 132, a user service provider 140, a merchant service provider 150, and an advertisement broker 160. Although not shown, additional service providers and advertisement brokers, as well as other parties, may be included in the system 100. For example, in one embodiment, one or more billing centers, such as 142 and 152, may keep call records and message delivery records, and may be part of or associated with each service provider (e.g., 140 and 150).

Network 110 is a physical communication network that connects the different parties with each other. Network 110 may include one or more components, such as wired networks (e.g., connected by telephone lines, fiber optic cables, cable wires, etc.), wireless networks (e.g., connected by satellite, cellular communication stations, or other wireless media), local area networks (LANs), wide area networks (WANs), the Internet, etc. As such, network 110 may include a number of server computers, bridges, routers, and hubs, telecommunication lines, broadcasting and receiving towers, gateway devices, etc., capable of assisting in communications between various parties. Although the different parties are shown in FIG. 1 as being outside of the network 110, the parties may be considered to be part of the network 110, as they are connected to it. Nonetheless, as described further below, certain parties may directly connect to a particular network (e.g., users may directly connect to a wireless network provided by a wireless service provider), while others directly connect to a different network (e.g., merchants may connect to a wired network provided by a merchant service provider), and the different networks may be connected to each other to form network 110.

Users 120 refer to parties who access network 110. For example, users 120 may include a person, family, etc., who uses one or more devices 122 that provide access to the network 110. In one embodiment, a user 120 may be an owner of a device 122, such as a mobile phone, tablet computer, laptop computer, etc., who accesses a network such as the Internet using the device 122. In another embodiment, a user 120 may include a person or group of people (e.g., a family) who use one or more devices 122 to communicate over the network 110. For example, users 120 may communicate over the network 110 using one or more computers, telephones, etc., that connect to the network via wired and/or wireless communication media using one or more communication protocols (e.g., PSTN, HTTP/IP, GSM, GPRS, IEEE 802.11, etc.). Users 120 may be more generally described herein as first parties.

Merchants 130 refer to entities who provide goods or services and who use the network 110 to facilitate the provision of such goods or services. In certain embodiments, merchants 130 have access to telephone service, for which they have one or more telephone numbers. Merchants 130 may therefore have one or more telephones 132, which may be cellular phones, land line phones, computer-accessible telephony service via, for example, Internet-enabled voice over IP, etc. As described herein a telephone refers to any device capable of calling out or receiving in a call based on a standard telephone numbering system. A telephone call refers to any call made that uses such a telephone number system for routing and connecting of two parties for voice-based real-time communications. As used herein, a voice call includes telephone calls, but may also include real-time voice communications between two or more parties that connect without using a telephone number. In addition, though voice calls and telephone calls are described specifically herein, the methods and systems described herein could be used for other types of real-time point-to-point communications between two parties over network 110 (e.g., text chat, video conferencing, etc.).

In certain embodiments, merchants 130 have a network presence, such as a Web page. Merchants 130 may be companies or individuals. As described further below, merchants 130 may use advertisements as a way to encourage users 120 to purchase goods and/or services. Merchants 130 may communicate over the network 110 using one or more computers, telephones, etc., that connect to the network via wired and/or wireless communication media using one or more communication protocols (e.g., PSTN, HTTP/IP, GSM, GPRS, IEEE 802.11, etc.). Merchants 130 may be more generally described herein as second parties.

User service provider 140 refers to an entity that provides users 120 with access to network 110. More specifically, user service provider 140 may provide a particular group of users 120 (e.g., those who pay for services) with access to a particular network (e.g., a PSTN, a wireless network, the Internet, etc.). The user service provider 140 may therefore serve as a go-between connecting users 120 to different parties over network 110. In one embodiment, user service provider 140 maintains network equipment, such as computers, telephone switches, communication lines, etc., in order to provide users 120 with access to the network 110. An example of a user service provider 140 is a large telecommunications company, such as Verizon, or AT&T, who provide users 120 with access to the Internet, or the PSTN, over their devices, such as landline telephones, wireless telephones, and home computers.

As described further below, user service provider 140 may maintain records of users 120 and user activities, such as telephone calls made and received, advertisements received, amount of data accessed, etc. For example, user service provider 140 may include a billing center 142, which maintains such records. The billing center may be implemented using, for example, one or more computers that maintain databases of records. Although only one user service provider 140 is shown in FIG. 1, a plurality of user service providers may exist on network 110. Each may provide access to different sets of users 120, and in some cases, multiple user service providers 140 may provide access to a single user 120 (e.g., a different wireless phone service provider from a landline Internet service provider). User service providers 140 may be referred to generally herein as third parties.

Merchant service provider 150 refers to an entity that provides merchants 130 with access to network 110. More specifically, merchant service provider 150 may provide a merchant 130 or particular group of merchants 130 with access to a particular network (e.g., a PSTN, a wireless network, the Internet, etc.). The merchant service provider 150 may also provide the merchants with Web-based services, for example, to run a website. The merchant service provider 150 may therefore serve as a go-between connecting merchants 130 to different parties over network 110. In one embodiment, merchant service provider 150 maintains network equipment, such as computers, telephone switches, communication lines, etc., in order to provide merchants 130 with access to the network 110. An example of a merchant service provider 150 may also be a large telecommunications company, such as Verizon, or AT&T, who provide merchants 130 with access to the Internet, or the PSTN, over their devices, such as landline telephones, wireless telephones, and home computers.

As described further below, merchant service provider 150 may maintain records of merchants 150 and merchant activities, such as telephone calls made and received, advertisements delivered, billing rates for calls, etc. For example, merchant service provider 150 may include a billing center 152, which maintains such records. The billing center may be implemented using, for example, one or more computers that maintain databases of records. Although only one merchant service provider 150 is shown in FIG. 1, a plurality of merchant service providers may exist on network 110. Each may provide access to different sets of merchants 130. Merchant service providers 150 may be referred to generally herein as third parties.

Ad broker 160 refers to an entity that provides advertising services to merchants 130 and provides advertisements to users 120. Although advertisements are specifically referred to herein, the methods and systems described herein may apply to any type of electronic message associated with a second party and sent to a first party. Ad broker 160 therefore serves as a go-between for merchants 130 and users 120. In one embodiment, Ad broker 160 includes one or more computers (e.g., servers) connected to the network 110 via one or more network interfaces. Ad broker 160 may maintain various databases of information for keeping track of advertisement metadata, advertisements served and clicked on, etc. Ad broker 160 may be associated with one or more search engines or web portals that deliver advertisements along with Web pages, search results, etc. For example, Ad broker 160 may be affiliated with Google, Yahoo!, or another similar Web search and/or portal company. Information stored by Ad broker 160, as well as its communication with merchant service provider 150 and user service provider 140 will be described in more detail below.

FIG. 2A-2C depict exemplary records that may be stored in association with advertisements and voice calls, in accordance with certain exemplary embodiments.

As shown in FIG. 2A, certain metadata may be stored for each advertisement. In one embodiment, the advertisements along with their metadata are stored at an Ad broker, for example, in an advertisement database.

FIG. 2A shows an exemplary data structure 200 for the merchant's advertisement, in accordance with one exemplary embodiment. A plurality of merchants can use advertising services from one or more Ad brokers. To keep track of the different advertisements, the advertisements can be stored along with metadata that specifically identifies the merchant, the Ad broker, and other information. In one embodiment, the information included in the data structure is stored in a database, for example at an Ad broker (e.g., 160).

In one embodiment, each advertisement may include a unique merchant ID 201 that can be associated with other metadata about the merchant, such as billing address, contact phone numbers, service provider name, service provider account number, etc. The merchant ID 201 and the other associated metadata may be stored in a database. The advertisement metadata may further include a list of categories 202 that classify what the advertisement relates to. This information may be used, for example, for selecting appropriate advertisements to be sent to particular users in response to user requests, Web page accesses, etc. Location 204 includes the map coordinates and/or street address of the merchant, which may also be used for selecting appropriate advertisements based on location. Sometimes, advertisers want a promotion to start or end on particular dates. Data element 205 therefore may include information relating to a start and end date for which a merchant would like an Ad broker to distribute an advertisement. Merchant phone number 206 may be a phone number of the merchant associated with the advertisement. For example, if an advertisement directs a user to contact a phone number, by a display of the phone number and/or a selectable link that when selected directs that a phone number be called, the phone number may be included in the metadata for the advertisement. An identifier of the Ad broker 207 may also be included in the metadata. In certain embodiments, the Ad broker gets a share of the revenue from the user's call, and so the Ad broker identifier 207 may be used to determine the revenue generated for the Ad broker. In one embodiment, the metadata includes information indicating an advertising copy 208, which can be a pointer to a list of various versions of the advertisement in at least one format. Additional information 209 may also be included in the metadata for advertisements.

FIG. 2B shows exemplary information 210 that can be stored in association with a user, for example, in a database at a merchant service provider.

For example, a user ID 211 identifies a user. For example, a user may have an account number, e-mail address, or phone number that is used to identify the user and that serves as the user ID 211. Other identifiers may be used as well. Transaction type 212 describes a transaction that occurred. For example, transaction types may include a send or receive advertisement transaction, a make telephone call transaction, or a received telephone call transaction. Records of these transactions may be included in the transaction type field 212. A merchant ID 213 identifies a merchant. For example, it may include a merchant name, merchant account number, merchant telephone number, etc. Time field 214 indicates a time. For example, if a transaction is made at a particular time (e.g., a telephone call is made at time T, advertisement sent at time T, or advertisement displayed at time T), an indication of the time (e.g., T) may be stored in the time field 214. Duration field 215 indicates a duration, for example, of a telephone call, or of an advertisement display. Call type 216 indicates a type of call. For example, if a telephone call is made using a PSTN landline phone, an entry in the call type field 216 may indicate as such. Similarly, if a telephone call is made by a selected link, for example using a wireless phone, VoIP, etc., an entry may indicate the type of call. Device field 217 indicates a device used for a transaction. For example, it may determine a device based on an IP address, a MAC address, a phone number, etc. The identifier may therefore indicate the type of device (e.g., if the particular identifier is already associated with a particular type of device). Other fields may be included along with the above listed information in connection with transactions.

In one embodiment, when a transaction occurs, the information related to the transaction is stored in a database. For example, if an advertisement for a merchant is sent to a user, entries may be added to a database to store a user ID for the user (e.g., the user's account number or telephone number), a transaction type (e.g., advertisement delivered), a merchant ID (e.g., merchant account number or phone number), a time (e.g., 12:30 p.m.), a duration (e.g., the system can track how long the advertisement is displayed, such that if it is closed, or clicked on, a duration can be determined), a call type (e.g., wireless phone call), and a device (e.g., wireless phone registered with the user phone number). That information can later be used to determine whether a telephone call is made as a result of the receipt of an advertisement or other electronic message. Additional information, such as a listing of the advertisements sent, type of advertisement, and other information, may also be logged in the database.

Although a particular exemplary database structure is shown in FIG. 2B, other database structures for storing the above-described information may be used as well. For example, separate database tables may be used to store advertisement delivery and phone calls. In addition, separate tables may be maintained for each merchant, or for each user. In addition, some or all of the information described in FIG. 2B may be stored at a user service provider (e.g., at a billing center 142 of user service provider 140) and/or a merchant service provider (e.g., at a billing center 152 of merchant service provider 150).

FIG. 2C shows an exemplary call information 220 that can be stored, for example, in a database for storing billing information for phone calls received by a merchant, according to one embodiment. As shown in FIG. 2C, the database may include a caller ID 221, call time 222, call duration 223, call type status 224, billing rate 225, and total bill amount 226.

Caller ID 221 may be, for example, a phone number or other identifier of a caller who calls the merchant. Call time 222 may be a time at which the call is received, and call duration 223 may be a duration of the call. Call type status 224 may indicate a type of call. For example, it may indicate whether a call is a call responsive to an advertisement, an unsolicited call, or a call representing a sale. For example, in one embodiment, if it is determined that the call results from an advertisement received by the person making the call, then the call may be flagged as a call responsive to an advertisement. If the call then has a certain duration, it may be flagged as a call resulting in a sale. If the call is determined to not result from an advertisement, it may be flagged as an unsolicited call. Billing rate 225 includes a billing rate associated with the call. The billing rate 225 may depend, for example, on the call type indicated by the call type status 224, the caller ID, the merchant ID and/or service plan, and other information. The total bill amount 226 includes a total bill amount for the call, based, for example, on the call duration and/or the billing rate 225. The information 220 may be used, for example, to formulate a bill to a merchant for using a particular service provider for telephone service. In one embodiment, the information 220 is stored in a database at a merchant service provider (e.g., at a billing center 152 of merchant service provider 150). However, information 220 may be stored at other locations as well.

Although not described in detail above, additional information related to an Ad broker may also be stored in one or more databases such as described in FIGS. 2A-2C. For example if an Ad broker has an agreement to receive part of a payment from a merchant to a service provider for phone calls that result from advertisements, the relevant information needed to properly compensate the Ad broker may also be stored (e.g., a percentage of the total bill amount to be paid to the Ad broker).

Also, although the information described in FIGS. 2A-2C is described as being stored at a particular location (e.g., advertisement metadata at an Ad broker, billing information at a merchant service provider, etc.), certain of the information can be copied and/or shared between different network entities.

FIG. 3 depicts an exemplary method 300 of correlating voice calls with electronic messages received by users, according to certain exemplary embodiments. In step 310, a first party receives an electronic message associated with a second party. For example, a user may receive an electronic message associated with a merchant. In one embodiment, the electronic message may be an advertisement. The electronic message may be received as part of a search request and result. For example, a user may make a search request from a user device, and in response receive a list of results that include one or more advertisements for one or more respective merchants. The search may be made, for example, using a search engine wherein the user enters one or more search terms in a browser, and receives in the browser a list of one or more search results that include the advertisements. The search may be textual, voice based (e.g., using voice-to-text software), etc. In one embodiment, the search is made using a data connection from a mobile phone configured for both data and voice connections.

In one embodiment, the advertisements are received from an ad broker, such as ad broker 160 described above in connection with FIG. 1. The advertisements may have certain metadata associated with them, such as discussed above on connection with FIG. 2A. The metadata can be used to track the distribution and use of the advertisements to and by users.

The advertisements may also be sent to a user in other manners besides in response to a search. For example, certain advertisements may be attached, for example as a banner ad or other graphical or text-based advertisement, in an e-mail, or on a Web page viewed by a user.

The advertisements may be location based. For example, in one embodiment, a search request includes the phone's location, derived for example from GPS, triangulation, or other means. In another embodiment, the Ad broker (e.g., 160) may communicate with the user service provider (e.g., 140) to determine the user device's location. In yet another embodiment, the Ad broker determines the user device's location based on a source address of packets received from the device. In a further embodiment, the user sends an explicit desired location for the search, which may or may not be the user's actual location. If the advertisement is received at a user device not automatically associated with a user's account (e.g., in a Web page at a standard Web browser on a publicly accessible computer or computer connected to a WiFi portal), then the user may log in to a particular Web service, and the advertisements can be selected based on the user's login information.

In one embodiment, advertisements received by the user include an indicator used to make a voice call. For example, the advertisements can include a textual listing of a telephone number. In addition, or alternatively, the advertisements can include a selectable link that when selected, automatically makes a voice call to a telephone number associated with the advertisement. As a specific example, a user may receive on the user's mobile device an e-mail or search result that includes a graphical advertisement with a selectable link in the form of a telephone number. The user can then select the link to initiate a telephone call from the user's device to the listed number, which may be a telephone number of the merchant associated with the advertisement.

As shown in step 320, the first party makes a voice call to the second party. For example, a telephone call may be made in the specific manner described above. As such, a user may receive an advertisement on a particular device, and may make a voice call from the same device in response to the advertisement. Alternatively, the voice call can be made from a different device than the device that receives the advertisement. For example, in certain embodiments, a user may use a same service provider for both landline telephone access and wireless Internet access. Therefore, if a user receives an advertisement on the user's wireless device, the user may make a telephone call using the landline telephone service (e.g., PSTN) or using a home computer via voice over IP (VoIP). As described below, records may be kept for the combined services, which records may be used to determine when a voice call is made as a result of a received advertisement.

In step 330, it is determined whether the voice call results from the receipt of an electronic message, such as an advertisement. For example, in one embodiment, using information about a delivered advertisement and a voice call stored in one or more of the databases discussed in connection with FIGS. 2A-2C, a user service provider and/or merchant service provider may automatically determine whether a voice call resulted from a delivered advertisement. For example, in one embodiment, an amount of time (e.g., time period T) between the receipt or displaying of the advertisement and the initiation of a voice call may be determined, for example, from the records 210 discussed in connection with FIG. 2B. If the time period T is less than a predetermined threshold (e.g., 20 minutes, 5 minutes, etc.), then it may be determined that the voice call resulted from the advertisement. As such, the record associated with the voice call may be flagged to have a different status from voice calls made that did not result from advertisements. For example, even if the same number is called, in one instance (e.g., if it was made within 1 minute of receiving an advertisement), the call is logged as being in response to an advertisement, but in another instance (e.g., it was made a day later from when any advertisements were received), the call is logged as being not in response to an advertisement. In this way, a single number can be used by a merchant, both for responses to advertisements and for customer service, for example, but different types of calls can be automatically assigned different statuses.

In another embodiment, a call made based on selecting a link in an advertisement may be logged as having the status of being in response to an advertisement. Other indicators may also determine whether a call is made in response to an advertisement (e.g., whether an advertisement was continuously displayed prior to a call being made)

In step 340, based on the determined status of the voice call, a second party, such as a merchant, can be billed an appropriate amount for the call. For example, a merchant may subscribe to a particular calling plan where received voice calls that result from advertisements are billed at a first rate, and received voice calls that do not result from advertisements are billed at a second rate. The first rate can be higher than the second rate. Based on the billing rate and a length of the call, a total billing amount may be determined. In addition, other factors may be used to determine the total billing amount. For example, based on a duration of a call, it may be determined that a sale was likely made. More specifically, if a call is first determined to result from an advertisement, and then the call lasts for more than a particular predetermined period of time (e.g., 5 minutes), the call may be flagged with a status that indicates a sale, or potential sale. Such calls may be billed at a third rate. In one embodiment, the third rate is higher than either the first or second rates. The billing amounts may be stored, for example, as part of the information discussed above in connection with FIG. 2C.

Additional specific exemplary embodiments are further discussed in connection with FIGS. 4-6, which show logical lines of communication between different exemplary parties connected to a network such as network 110 discussed above.

Figure 4:
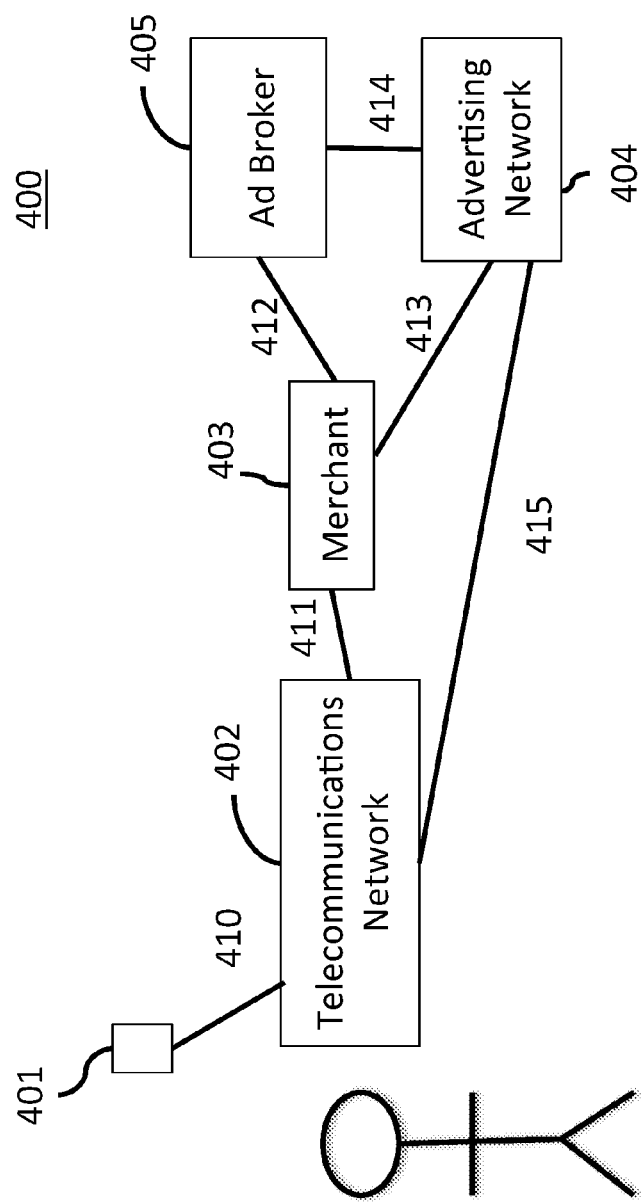
FIG. 4 is an illustration of an exemplary communication system, according to one exemplary embodiment.

As shown in FIG. 4, a system 400 includes a user device 401, a telecommunications network 402, a merchant system 403, an advertising network 404, and an Ad broker 405. In one embodiment, user device 401 is an integrated phone and Internet access device such as a smart mobile phone like an Apple iPhone, HTC Ozone, Palm Pre 2, BlackBerry Curve, etc. However, user device 401 can also be a regular mobile, fixed-line, or voice-over-IP (VoIP) phone used in conjunction with an Internet access device such as an Apple iMac, Apple iPad, or other personal computer, tablet, or other Internet-capable browsing device.

User device 401 may communicate via wired or wireless communication media to access telecommunications network 402. Telecommunications network 402 can be, for example, one or more of a wireless network, an access network, one or more transit networks, and an egress to the merchant 403. For example, telecommunications network 402 can include the Internet as well as a user's wireless service provider network.

Merchant 403 may use a system that includes one or more devices, such as telephones, computers, and other communications equipment used by a merchant to communicate with potential customers. Advertising network 404 may include one or more computers or other devices that allow the provision of advertisements to users. For example, advertising network 404 may include an advertisement distributor, such as a search engine, Web portal, or e-mail service. Ad broker 405 may include one or more computers for storing advertisements that may be distributed to users.

As shown by the logical communications links in FIG. 4, in one embodiment, a user device 401 communicates via communications link 410 with the network 402. The merchant 403 communicates via communications link 411 with the network 402 and thereby can communicate with the user device 401. In addition, the merchant 403 communicates via communications link 412 to the Ad broker 405, by which the merchant 403 can set up advertising services. The merchant 403 further communicates via communications link 413 with advertising network 404. Advertising network 404 and Ad broker 405 also communicate, for example, over communications link 414, and advertising network 404 further communicates via link 415 with network 402, and ultimately with the user device 401 through network 402.

Figure 5:
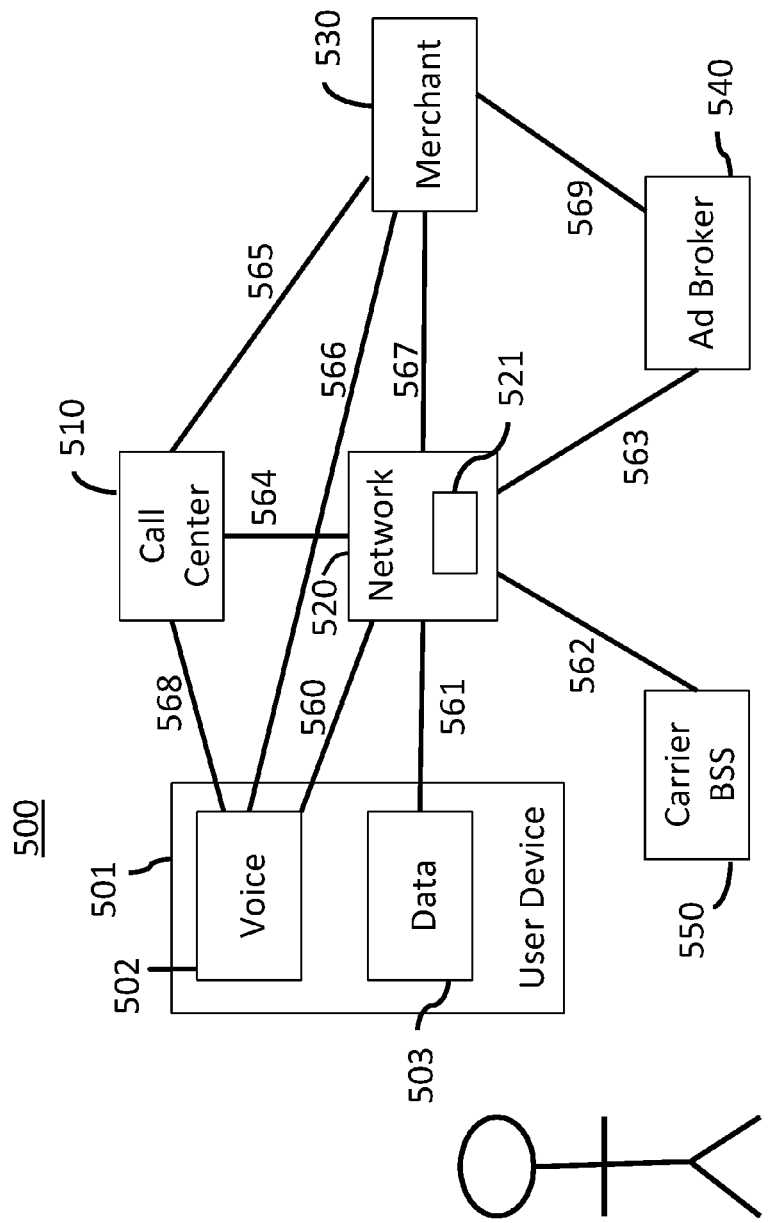
FIG. 5 is an illustration of an exemplary communication system, according to one exemplary embodiment.

FIG. 5 shows a more detailed description of an exemplary system 500 for implementing one or more of the embodiments discussed above. As shown in FIG. 5, different devices and systems within system 500 communicate with each other via logical communication lines and media. For example, a smart mobile phone device 501 may be used. Smart mobile phone device 501 may have two communications components—one component 502 for connecting to a user service provider's voice network and one component 503 for connecting to the user service provider's data network. Note that in 4th-generation wireless technologies such as Long-Term Evolution (LTE), the voice traffic physically transits the service provider's data network. However, even in this situation, the service provider may provide specialized services and, in particular, billing information related to the connection nature of the voice calls.

For simplicity of explanation, we will treat the user's voice traffic, such as indicated by a call made either via the network 520 via communication link 560 or via another means (e.g., PSTN over communication link 566) as a voice connection, even if it physically runs on the same infrastructure as the user's data traffic. Network 520 may include the user service provider, merchant service provider, and advertising network, as discussed previously. In one embodiment, network 520 includes an advertising system 521, which is used to coordinate various aspects of the communications related to advertisements and voice calls. In one embodiment, advertising system 521 includes one or more server computers.

As shown in FIG. 5 the user may conduct a search for a product or service provided by one or more merchants 530. In one embodiment, the user performs a search using a client browser or other user interface on the data portion 503 of the user device 501. This search can be textual, driven by speech recognition, or with other means. The client directs this request to the network 520 over the data link 561. For example, the request may be sent to advertising system 521 of of network 520. In addition, in one embodiment, the client includes the user device's location, derived from GPS, triangulation, or other means, with the request. In another embodiment, the advertising system 521 queries a telecommunications carrier 550 to determine the device's location, for example, over communication link 562. For example, the telecommunications carrier 550 may be part of a user service provider that provides, for example, wireless connection services for user device 501 and knows the location of user device 501. In another embodiment, the advertising system 521 determines the location based on the source address of the packets received from the user device 501. In another embodiment, the user may send an explicit desired location for the search, to enable searches for a target location, which may or may not be the same as the user's current location.

The advertising system 521 selects a list of merchants, for example, from a stored database of merchants and returns the appropriate list to the user device 501 for display to the user. In one embodiment, this interaction, including the search request and display of search results, occurs in a proprietary client that sends information identifying the user to the advertising system 521. However, the above-described features are available even if the user performs the interaction using a standard web browser with no supporting applications on the user device. In this embodiment, the user may need to log into the network 520 (e.g., by logging on to the user's service provider's website) so the network 520 and advertising system 521 know who is running the query. For example, a user ID may be associated with a mobile phone, as well as a login name used to access a service provider site via the Internet. This enables functionality for the user, such as profile and preference information. Moreover, it provides important correlation information for the actual call to the merchant. Other embodiments that present search results to the user that the user then uses to contact the merchant will also be apparent to those skilled in the art. The selected search results may be in part determined based on a communication with Ad broker 540 by the advertising system 521, for example, over communication link 563. For example, a plurality of merchants 530 can buy advertising services from one or more advertising brokers 540. These advertising brokers 540 communicate the metadata about the selected merchants 530 and their advertisements. The metadata may include, for example, the information about the advertisement such as information discussed previously in connection with FIG. 2A.

With the list of merchants returned to the user device 501, the user selects one of the merchants and, in one embodiment, clicks directly on the result. This directs the user device 501 to place a voice call to the merchant 530. The voice call may be made, for example, over communication links 560 and 567, or may be made over communication link 566. In one embodiment, the client at the user device 501 notes that a call resulted from the search, and transmits this information to the advertising system 521 and/or the user service provider and/or merchant service provider. In one embodiment, the client notes both the start and end times, either by sending a message at the beginning of the call and at the end of the call or by sending a single message at the end of the call. In this way, the advertising system 521 knows that the user placed the call as a direct result of the search result.

In an alternate embodiment, the user activates the phone's native ability to detect telephone numbers in a response. In yet another embodiment, the user simply dials the returned telephone number for the merchant using a phone dialing interface.

In another embodiment, the user contacts a call center 510, for example via communication link 568, where a customer service representative (CSR) interacts with the caller and submits a query to the advertising system 521 over communication link 564 on the user's behalf. Based on the query results and the user's preference, the CSR can transfer the call to the merchant 530, either by placing a call directly to the merchant 530 (via communication link 565) and bridging the call at the call center or by using the ISDN PRI two B-channel transfer, SS7 release-link-trunk, or SIP REFER mechanisms to connect the user to the merchant 530 directly (via 566).

In another embodiment, the user contacts an interactive voice response (IVR) system, where the user interacts via voice to create the search. The IVR submits the query to the advertising system 521, and speaks the results to the user. At that point, the user can choose to call one of the merchants in the result, ask to refine the search, or perform other tasks.

In one embodiment, the telephone network sets up a call from the user device 501, more specifically the voice portion of the user device 501, to the merchant 530 (e.g., a merchant telephone device) over connection 566. In one embodiment, the carrier's billing support system (BSS) 550, which may be part of the user service provider and/or merchant service provider collects its billing information based on calls made. The information may be stored in one or more databases, as described above.

In one embodiment, the merchant 530 places advertisements with one or more Ad brokers 540, for example, via communication link 569. The Ad broker 530 delivers the advertisements to the advertising system 521 over communication link 563. In one embodiment, this data is delivered in real time using XML over SOAP. In alternate embodiments, a bulk data transfer protocol such as FTP is used. In other alternate embodiments, the merchant 530 delivers the advertisements and metadata directly to the advertising system 521 over communication link 567, again using XML/SOAP, FTP, or other data transfer protocols.

Figure 6:
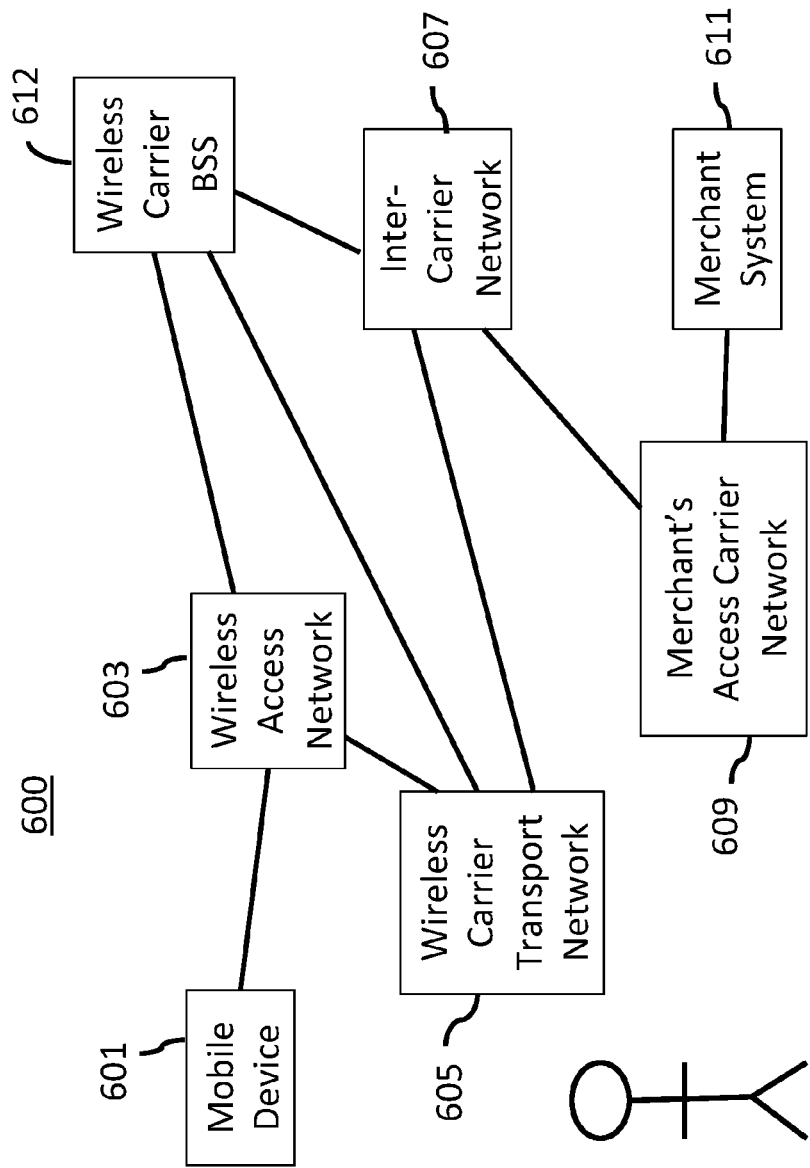
FIG. 6 is an illustration of an exemplary communication system, according to one exemplary embodiment.

FIG. 6 shows an exemplary system 600 including an exemplary set of call routing paths from a user device 601, which may be for example a mobile device, to a merchant system 611, which may include for example one or more computers and/or telephones. The paths may include a wireless access network 603, a wireless carrier transport network 605, a wireless carrier billing support system (BSS) 612, an inter-carrier network 607, and a merchant access carrier network 609. The different portions of the paths may be part of the previously described networks, advertising system, user service providers, and merchant service providers. In one embodiment, the mobile device 601 connects to a network such as the Internet through a wireless access network 603. The wireless access network 603 communicates with devices on the Internet via a wireless carrier transport network 605. In one embodiment, wireless access network 603 and wireless carrier transport network 605 are part of a service provider system. A wireless carrier BSS 612 communicates with the wireless access network 603 and the wireless carrier transport network 605, for example, to exchange billing and call information to allow for the call status flagging and billing procedures described previously. Wireless carrier BSS 612 may also be part of the service provider system.

The wireless carrier transport network 605 also communicates with an inter-carrier network 607, which may be further in communication with wireless carrier BSS 612. For example, inter-carrier network 607 may refer to the existing set of servers, routers, hubs, etc. on the Internet that provide communication between different service provider systems. Inter-carrier network 607 communicates with merchant 611 through the merchant's access carrier network 609. In one embodiment, if the merchant's access carrier network 609 is the same carrier network as the user's wireless access network 603 and/or wireless carrier transport network 605 (e.g., if both use Verizon services), then a more direct communication link may be formed between the user device 601 and the merchant system 611 without the need to pass through the inter-carrier network 607.

The present disclosure supports a novel business model where the merchant is willing to pay a premium to receive a call from a user when that call is in response to an advertisement. As depicted in FIG. 6 as an example, a wireless carrier's BSS 612 may store a record of the user placing a call to the merchant. In one client embodiment, where the user places the call from the proprietary client such as described above, the client may send the call detail record directly from a user's device to a merchant's service provider on the network. However, in some cases this may not be possible. For example, the call may be made with a standard, non-proprietary device (e.g., a land-line telephone). As another example, under some phone operating systems, the user may block the sending of the billing message. In addition, the phone may crash or lose power before sending the billing message. Therefore, the present disclosure addresses these and other situations.

Referring back to FIG. 5, the advertising system 521 connects to the carrier BSS 550. In one embodiment, the advertising system 521 loads billing triggers into the BSS 550 over link 562. In one embodiment, this trigger uses an identifier of the particular user and the directory number of the merchant. The user's identifier can be, for example, the user's telephone number for wire-line devices and the mobile identification number for wireless devices. When the advertising system 521 serves an advertisement to the user (e.g., either to the user device 501 or to the user when logged into a user account associated with the user), the advertising system 521 also sends a message to the carrier BSS 550 to arm the trigger for a suitable period of time. If the user dials the merchant within that time period, the BSS 550 will store and/or transmit a notification of the call details. Exemplary call details are depicted in FIG. 2C, described previously.

In an alternate embodiment, the advertising system 521 waits a predetermined period of time after serving the advertisement to user or the user's device 501 before querying the carrier BSS 550 to determine if the user placed a call to the merchant in response to the advertisement.

In another alternate embodiment, the advertising system 521 receives a periodic transfer of the user's call detail records from the carrier BSS 550. With this information, the advertising system 521 searches for calls placed to merchants and advertisements sent to users that meet the criteria of the user placing the call near the time of the advertising impression.

In one embodiment, the time period criteria may be 20 minutes. For example, if a voice call is made by a user to a merchant within 20 minutes of the user receiving an advertisement for the merchant, the voice call may be logged as resulting from the advertisement. This is enough time to handle the situation where a user makes a query, gets distracted and does something else, and then comes back to the results to place the call. The time period can vary. For example, it may be set as 1 minute, 3 minutes, 5 minutes, 10 minutes, etc. The trade off for having shorter times is having the time period too short, and thus missing a call placed in response to the advertisement, or having the time period too long, and thus considering a regular call, not related to the advertisement, billed as being in response to the advertisement. Therefore, a plan can be set up that uses different times periods. In certain embodiments, the time period may vary depending on certain criteria, such as a user's historic searching-to-calling behavior, experience with different classes of searches, time of day, and so on.

In yet another embodiment, the system can use heuristics such as the length of the call to distinguish between a general inquiry and a call that results in a sale. Merchants would likely be willing to pay an additional premium for a call that results in a sale. As a result, the carrier can bill a rate based on different call statuses, and can create new billing models based on these statuses. For example, the carrier could offer standard inbound calling for free, but charge a premium for calls that result from an advertisement, and an additional premium on calls that are likely to result in a sale. These heuristics depend on the sector. For example, in certain cases, a call of a length of 5 minutes or more may represent a likely sale. In addition, rates can be based on historical usage and calls, for example based on a history tracker database. Using this data base, the system may correlate length of call, mode of merchant access, and other parameters to determine if the given call represents a potential sale.

By pulling the billing record from the user's carrier, such as BSS 550, the disclosed embodiments handle roaming, for example, even if the user is not on the carrier network. The advertising system disclosed herein can correlate any search from any data device registered to the user, not necessarily as part of an integrated device, to a call to the merchant, so long as the carrier has a billing record for the call. Likewise, the merchant does not need to be a subscriber of the user's carrier. With connections to multiple telecommunication networks, multiple advertising brokers, and many merchants, the advertising system disclosed herein can offer a near ubiquitous service.

In certain embodiments, billing and usage reports are created, which include information such as described above in connection with FIGS. 2B and 2C. As a result, a merchant can be informed, in real-time and on a periodic basis, of charges accrued for voice calls received.

While the present disclosure has been particularly shown and described with reference to exemplary embodiments thereof, it will be understood that various changes in form and details may be made therein without departing from the spirit and scope of the following claims.

What is claimed is:

1. A method of correlating real-time communications with received electronic messages, the method including:
    sending an electronic message associated with a second party to a first party;
    subsequently receiving a real-time communication from the first party by the second party;
    automatically determining whether the real-time communication resulted from the electronic message, based on electronically stored information about the sending of the electronic message and about the subsequently received real-time communication; and
    if it is determined that the real-time communication resulted from the electronic message, flagging the real-time communication to have a different status from real-time communications not determined to have resulted from an electronic message.

2. The method of claim 1, wherein sending the electronic message includes:
    sending the electronic message over a telecommunications network to a first user device of the first party.

3. The method of claim 2, wherein the telecommunications network includes the Internet.

4. The method of claim 2, wherein the electronic message further includes:
an advertisement including an indicator used to make the voice real-time communication.

5. The method of claim 4, wherein the indicator is at least one of: a selectable link, or a telephone number.

6. The method of claim 1, wherein automatically determining whether the real-time communication resulted from the electronic message includes:
determining a length of time between the sending of the electronic message and the receiving of the real-time communication; and
if the length of time is less than a predetermined amount, determining that the real-time communication resulted from the electronic message.

7. The method of claim 1, further comprising:
billing the second party for the real-time communication, based on the flagged status of the real-time communication.

8. The method of claim 7, further comprising:
billing the first party at a first rate for real-time communications received by the first party and flagged with a status indicating that the real-time communications resulted from an electronic message; and
billing the first party at a second rate for real-time communications received by the first party and flagged with a status indicating that the real-time communications did not result from an electronic message, wherein the first rate is higher than the second rate.

9. The method of claim 1, wherein:
the real-time communication is a telephone call made using a telephone number.

10. A method of charging a merchant for received real-time communications, the method comprising:
maintaining a database that stores a record of sent electronic advertisements, indications of users who receive the electronic advertisements, and information indicating a time at which the users receive the electronic advertisements;
automatically storing, in the database, records of real-time communications made to the advertisers by the users who received the electronic advertisements;
using the database, for each real-time communication to a merchant from a user, automatically determining whether the real-time communication was made within a predetermined time period T from a time at which the user received an electronic advertisement for the merchant; and
based on the determination, selecting an amount and/or rate to charge the merchant for the real-time communication.

11. The method of claim 10, further comprising:
when the determination indicates that a real-time communication was made by a particular user within the time period T from when the user received an advertisement for a particular merchant, then charging the merchant a first rate for the real-time communication; and
when the determination indicates that a real-time communication was made by a particular user after the time period T from when the user received an advertisement for a particular merchant, then charging the merchant a second rate for the real-time communication, wherein the second rate is lower than the first rate.

12. The method of claim 10, further comprising:
storing in the database for each real-time communication received by a user made to a merchant, an indication of the duration of the real-time communication; and
charging the merchant for real-time communications based on the duration of the real-time communications.

13. The method of claim 10, further comprising:
transmitting the electronic advertisements over the Internet as visual display advertisements.

14. The method of claim 13, further comprising:
initiating the real-time communications by one or more of:
selecting a link in a visual display advertisement on a first device on which the link is displayed; or dialing the telephone number of a merchant from a second device different from the first device on which the link is displayed.

15. The method of claim 14, wherein the real-time communications are voice calls, and further comprising:
maintaining voice call records for at least a first user, the voice call records including first voice call records for voice calls made using the first device and second voice call records for voice calls made using the second device; and
determining whether a voice call was made within a predetermined time period T from a time at which the user received an electronic advertisement for the merchant, based on the first voice call records and the second voice call records.

16. The method of claim 15, wherein:
the first device is a mobile telephone device, and the second device is a land line telephone device.

17. The method of claim 10, wherein:
the real-time communications are telephone calls made using respective telephone numbers.

18. A method for receiving voice calls by recipient parties, the method including:
sending electronic messages to potential callers, the electronic messages indicating a method for calling the recipient parties;
maintaining a database that stores a list of the sent electronic messages, indications of potential callers who received the electronic messages, and information indicating a time at which the users received the electronic messages;
automatically storing in the database records of voice calls made to the recipient parties by the potential callers who received the electronic messages;
using the database, for each voice call to a recipient party from a potential caller, automatically determining whether the voice call was made within a predetermined time period T from a time at which the potential caller received an electronic message indicating a method for calling the recipient party; and
based on the determination, selecting an amount and/or rate to charge the recipient party for the voice call.

19. A method for determining how much to bill a merchant for a voice call received by a caller, the method comprising:
storing, in a database, a list of calls made by the caller from at least two calling sources including a first calling source and a second calling source, the list including a time at which each call was made;
storing, in the database, a list of advertisements received by the first calling source, the list including an indication of a time at which each advertisement was received and/or displayed at the first calling source;
automatically determining, based on the list of calls made and the list of advertisements received, whether any of the calls were calls made to the merchant within a predetermined time period T of the first calling source receiving and/or displaying an advertisement for the merchant;

when it is determined that a call was made to the merchant within a predetermined time period T of the first calling source receiving and/or displaying an advertisement for the merchant, charging the merchant for the call based on a first billing scheme; and when it is determined that a call was made to the merchant after the predetermined time period T of the first calling source receiving and/or displaying an advertisement for the merchant, charging the merchant for the call based on a second billing scheme different from the first billing scheme.

20. The method of claim 19, wherein the second billing scheme includes lower billing rates than the first billing scheme.

* * * * *